(12) United States Patent
Faerber et al.

(10) Patent No.: US 9,037,129 B2
(45) Date of Patent: *May 19, 2015

(54) METHOD, NETWORK AND DEVICE FOR INFORMATION PROVISION BY USING PAGING AND CELL BROADCAST SERVICES

(71) Applicant: Cellular Communications Equipment LLC, Plano, TX (US)

(72) Inventors: Michael Faerber, Wolfratshausen (DE); Martin Oettl, Weilheim (DE)

(73) Assignee: Cellular Communications Equipment LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/519,893

(22) Filed: Oct. 21, 2014

(65) Prior Publication Data

US 2015/0038106 A1 Feb. 5, 2015

Related U.S. Application Data

(63) Continuation of application No. 12/450,608, filed as application No. PCT/EP2008/053915 on Apr. 2, 2008, now Pat. No. 8,868,060.

(30) Foreign Application Priority Data

Apr. 2, 2007 (EP) .................................. 07006867

(51) Int. Cl.
*H04M 3/42* (2006.01)
*H04H 20/59* (2008.01)
(Continued)

(52) U.S. Cl.
CPC .............. *H04H 20/59* (2013.01); *H04W 68/00* (2013.01); *H04W 76/002* (2013.01); *H04W 4/22* (2013.01); *H04W 68/005* (2013.01)

(58) Field of Classification Search
USPC ...................... 455/419, 404.1, 414.1; 340/539
See application file for complete search history.

(56) References Cited

U.S. PATENT DOCUMENTS

| | | | |
|---|---|---|---|
| 5,278,539 A | 1/1994 | Lauterbach et al. | |
| 5,430,440 A | 7/1995 | Shim | |

(Continued)

FOREIGN PATENT DOCUMENTS

| | | |
|---|---|---|
| CN | 1722804 A | 1/2006 |
| EP | 1 501 328 A2 | 1/2005 |

(Continued)

OTHER PUBLICATIONS

3rd Generation Partnership Project; Technical Specification Group Terminals; Technical Realization of Cell Broadcast Service (CBS) (Release 1998), 3GPP TS 03.41 V7.4.0, pp. 1-31, Sep. 2000, 31 pgs.

(Continued)

*Primary Examiner* — Charles Shedrick
(74) *Attorney, Agent, or Firm* — Martin & Ferraro, LLP

(57) ABSTRACT

The invention relates to a method, terminal and network or entity wherein a broadcast service is used for informing a number of users on an emergency or other situation of public interest. A specific identifier is used in a paging message for activating broadcast service in the terminals. A terminal checks a received paging message with regard to the presence of the specific identifier and when detecting the specific identifier, switches to a broadcast mode for receiving broadcast content. The received broadcast emergency content is notified and/or displayed to the users of the terminals.

20 Claims, 4 Drawing Sheets

(51) Int. Cl.
*H04W 68/00* (2009.01)
*H04W 76/00* (2009.01)
*H04W 4/22* (2009.01)

(56) References Cited

U.S. PATENT DOCUMENTS

| | | |
|---|---|---|
| 6,161,016 A | 12/2000 | Yarwood |
| 6,177,873 B1 | 1/2001 | Cragun |
| 6,559,753 B1 | 5/2003 | Uchida |
| 6,697,651 B2 | 2/2004 | Li |
| 7,127,230 B2 | 10/2006 | Aaron |
| 7,130,610 B2 | 10/2006 | Dolezal et al. |
| 7,519,351 B2 | 4/2009 | Malone, III |
| 7,577,971 B2 | 8/2009 | Kim et al. |
| 8,219,121 B2 | 7/2012 | Sim et al. |
| 8,260,249 B2 | 9/2012 | Andersen et al. |
| 2003/0143974 A1 | 7/2003 | Navarro |
| 2004/0227618 A1 | 11/2004 | Hwang et al. |
| 2005/0020260 A1 | 1/2005 | Jeong et al. |
| 2005/0037728 A1 | 2/2005 | Binzel et al. |
| 2005/0157669 A1 | 7/2005 | Zhu et al. |
| 2005/0237183 A1 | 10/2005 | Lamb |
| 2006/0079200 A1 | 4/2006 | Hirouchi et al. |
| 2006/0178128 A1 | 8/2006 | Eaton et al. |
| 2007/0004377 A1 | 1/2007 | Medford et al. |
| 2008/0194224 A1 | 8/2008 | Thorson et al. |
| 2008/0227428 A1 | 9/2008 | Rezaiifar et al. |
| 2009/0233634 A1 | 9/2009 | Aghili et al. |
| 2009/0239554 A1 | 9/2009 | Sammour et al. |
| 2009/0251315 A1 | 10/2009 | Lee et al. |
| 2010/0099439 A1 | 4/2010 | Aghili et al. |
| 2010/0151813 A1 | 6/2010 | Faerber et al. |
| 2010/0159870 A1 | 6/2010 | Jokinen |
| 2015/0038105 A1 | 2/2015 | Faerber et al. |

FOREIGN PATENT DOCUMENTS

| | | |
|---|---|---|
| EP | 1 513 368 A2 | 3/2005 |
| GB | 2 357 397 A | 6/2001 |
| JP | 10-336049 A | 12/1998 |
| JP | 2002-530024 | 9/2002 |
| JP | 2006-514467 | 4/2006 |
| JP | 2006-238379 | 9/2006 |
| WO | WO 02/25974 A1 | 3/2002 |
| WO | WO 2004/082298 A2 | 9/2004 |
| WO | WO 2005/072001 A2 | 8/2005 |

OTHER PUBLICATIONS

3rd Generation Partnership Project; Technical Specification Group Core Network and Terminals; Numbering, Addressing and Identification (Release 7), 3GPP TS 23.003 V7.1.0, pp. 1-51, Sep. 2006, 51 pgs.

Guvenc et al., "Reliable Multicast and Broadcast Services in Relay-Based Emergency Communications," IEEE Wireless Communications, pp. 40-47, Jun. 2008, 7 pgs.

International Search Report for PCT/EP2008/053915, mailed May 27, 2008.

Khedo, K. et al., "A Scalable Multimedia Multicast Protocol for Emergency Systems," IEEE, Jul. 2006, 7 pgs.

LeBow, G., "RBDS as an Emergency Broadcasting and Alert System," IEEE, pp. 198-199, Jun. 1993, 2 pgs.

U.S. Appl. No. 14/517,769, filed Oct. 2014, Faerber et al.

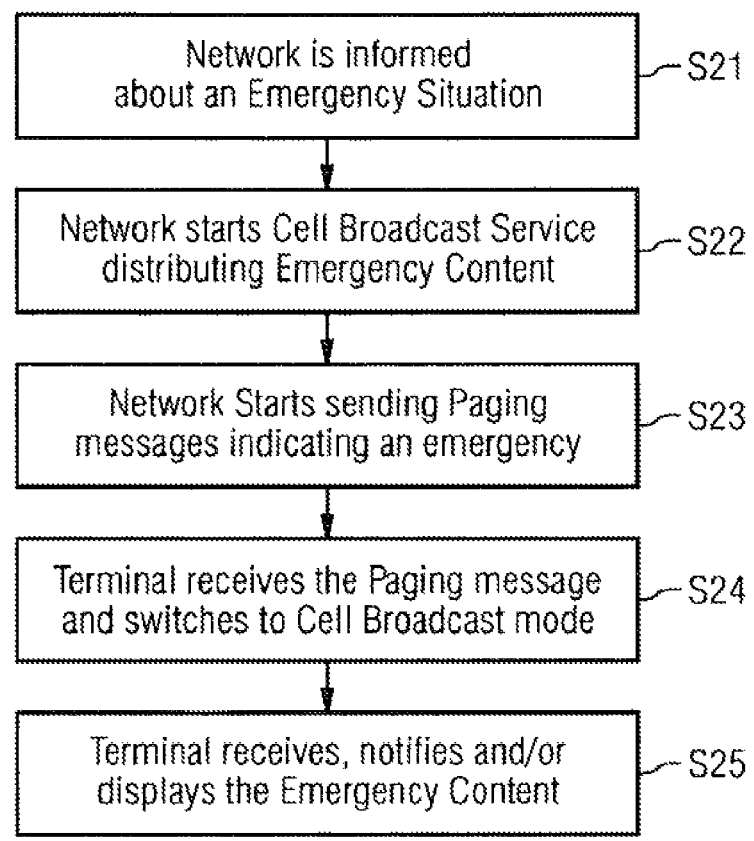

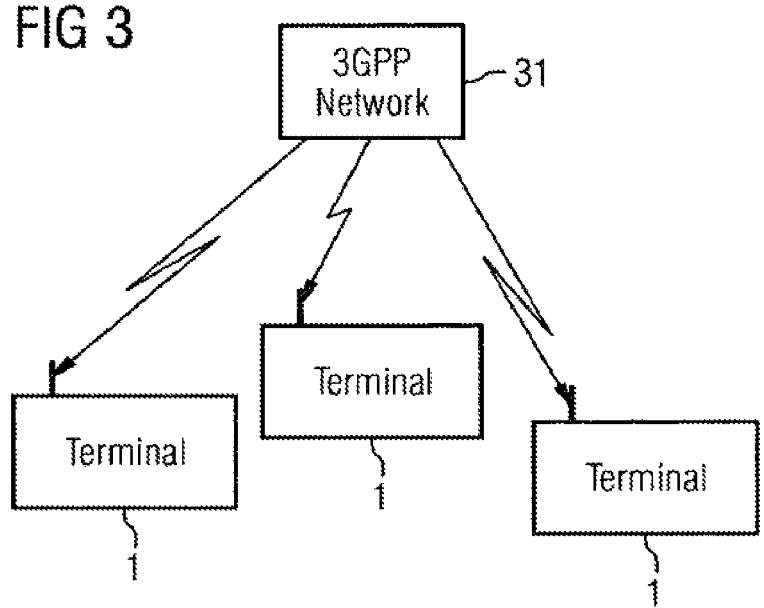
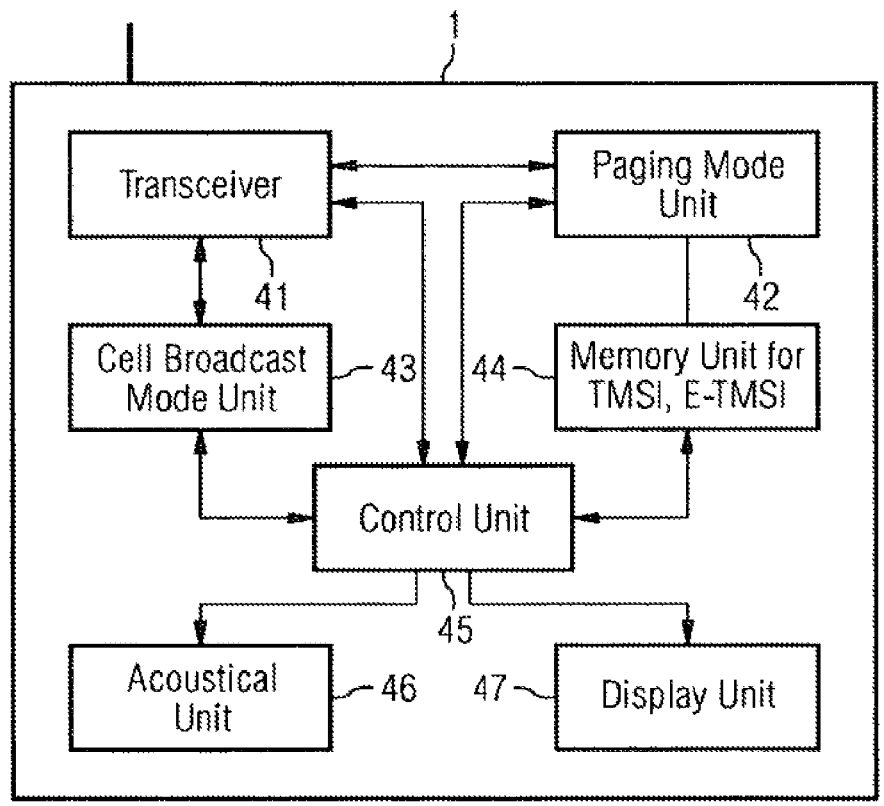

METHOD, NETWORK AND DEVICE FOR INFORMATION PROVISION BY USING PAGING AND CELL BROADCAST SERVICES

CROSS REFERENCE TO RELATED APPLICATIONS

This application is a continuation of U.S. patent application Ser. No. 12/450,608 filed Feb. 2, 2010, which is pending; which is the U.S. National Stage of International Application No. PCT/EP2008/053915, filed Oct. 2, 2009 with an assigned §371(c) acceptance date of Feb. 2, 2010; which claims the benefits of European Application No. 07006867 filed on Apr. 2, 2007; which are incorporated by reference herein in their entirety.

BACKGROUND

The field of communication in particular mobile communication, and more particular to information provision by using paging and cell broadcast services is addressed herein. More specifically, the enablement of emergency information provision by using enhanced TMSI definition and cell broadcast services is addressed.

Currently informing a large public about possible emergencies and hazards mainly is accomplished acoustically using such as a siren which can give only very limited information and requires a second information channel, e.g. radio broadcast, to get helpful guidance. Even in some regions of the world, such infrastructure does not exist, or the low population density makes deployment thereof inefficient.

GSM as of today has no specific precaution to support an efficient emergency information distribution.

Described below are methods and devices for conveying information such as emergency information to a large number of people in an efficient way.

In at least one of the implementations described below, public land mobile network, PLMN, based technology is used. Existing infrastructures can be utilized. In one or more of the embodiments, GSM is a choice of system due to its almost global coverage with more than one billion users world wide.

SUMMARY

According to at least one or more of the embodiments, an existing broadcast service can be used such as the GSM Cell-Broadcast Service which is an SMS type broadcast service and delivers in one session the notification and the message content. The cell-broadcast service allows sending of short messages to all mobile terminals attached or registered to a base station or cell. GSM 03.41 defines this Short Message Service-Cell Broadcast (SMS-CB) which allows messages to be broadcast to all mobile users in a specified geographical area.

The technology and standard is ready but not frequently used because the system design normally requires a very frequent reading of a notification channel, omitting almost a power saving sleep mode e.g. in a discontinuous reception, DRX, mode. This has harsh consequences on the battery drain and the stand-by time of a terminal. Therefore operators do not use these services but most of the terminals are supporting the feature.

In accordance with at least one of the embodiments, a broadcast service such as the Cell-Broadcast service is used for emergency support, yet avoiding the above mentioned significant consequences on the stand-by time of the mobile terminals. In at least one of the embodiments, this service is actively invoked by the terminal in case of need only, using a paging mechanism.

BRIEF DESCRIPTION OF THE DRAWINGS

These and other aspects and advantages will become more apparent and more readily appreciated from the following description of the exemplary embodiments, taken in conjunction with the accompanying drawings of which:

FIG. 2 is a flow chart of a method in accordance with an embodiment,
FIG. 3 is a basic block diagram illustrating an aspect of paging and broadcast in accordance with one, more or all of the embodiments,
FIG. 4 is a block diagram of an embodiment of a terminal.

DETAILED DESCRIPTION OF THE PREFERRED EMBODIMENT

Figure 1:
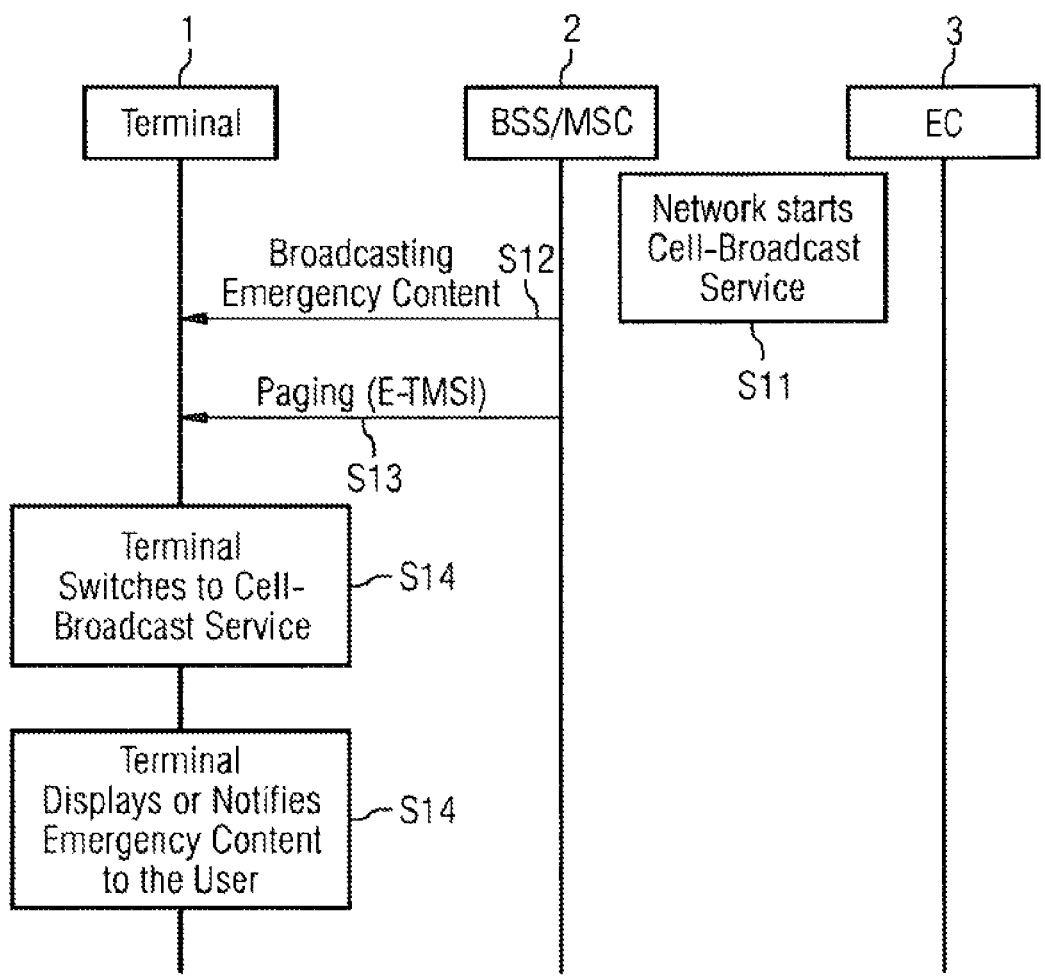
FIG. 1 is a timing diagram showing an embodiment.

Reference will now be made in detail to the preferred embodiments, examples of which are illustrated in the accompanying drawings, wherein like reference numerals refer to like elements throughout.

FIG. 1 shows an embodiment in which a terminal 1 such as a mobile terminal, mobile station or user equipment etc. is attached to a network via a base station system, BSS, or mobile switching center, MSC, 2 or any other access network. The network may include an emergency center 3 for handling emergency matters, or any other device which will instruct the network to broadcast emergency content or other content of public interest e.g. in case of emergencies. When the network learns, e.g. from the police or a medical institution, about an emergency or any other type of situation such as traffic jam etc. on which all users attached to a cell of the network should be informed, the network starts, in step S11, a broadcast service such as a cell-broadcast service. In step S12, the radio access network, RAN, or BSS/MSC 2 begins to broadcast emergency content specifying the actual emergency or other situation of public interest.

Further, in step S13, the RAN or BSS/MSC 2 sends one or more paging messages which include a specific identifier such as an E-TMSI which is accepted by all terminals 1 receiving the paging message. The steps S12 and S13 can also be carried out in reversed order or simultaneously. In response to the receipt of the paging message on step S13, the terminal 1 switches, in step S14, to Cell-Broadcast Service support and thus starts to listen to the broadcast channel. In step S15, the terminal 1 displays or notifies the content received from the broadcast channel to the user of the terminal 1 via a display or acoustical output the terminal 1.

Instead of the Cell-Broadcast Service, another broadcast service can also be used for informing the terminals on the emergency or other content.

FIG. 2 illustrates an embodiment of a method. In step S21, the network is informed about an emergency situation or other situation of public interest by receiving emergency or other actual contents enriched by a severity. The network starts or uses cell broadcast service distributing emergency or other actual content in step S22. Further, in step S23, the network starts sending paging messages which include a specific identifier for indicating an emergency or other situation. The steps S22 and S23 can also be carried out in reverse order, or simultaneously. The sent paging messages may indicate an emergency situation by help of the specific identifier such as an E-TMSI. When the terminals receive, in step S24, the paging message including the specific identifier such as E-TMSI, the terminals switch to support or activate the cell broadcast service or mode. In step S25, the terminal displays or announces or otherwise notifies the user of the terminal on the broadcast content.

FIG. 3 shows a general overview wherein a network such as a 3GPP network 31 sends paging messages and broadcast messages to all terminals 1 attached to a cell of the cellular mobile network 31. The paging messages and broadcast messages may also be transmitted in one, more or all other cells of the network 31 for increasing the number of users receiving the broadcast content.

FIG. 4 illustrates the internal structure of a terminal 1 in accordance with one or more embodiments. The terminal 1 of FIG. 4 includes a transceiver 41 for transmitting and receiving signals via an air interface, a paging mode unit 42 for processing or evaluating received paging messages, and a cell-broadcast mode unit 43 supporting a cell-broadcast service by frequently checking a broadcast channel with regard to broadcast messages. A memory unit 44 serves for storing a TMSI allocated to the terminal 1 from the network 31 and/or one or more specific identifiers which, when transmitted from the network, will cause the terminal 1 to start or activate the support of the cell-broadcast mode. A control unit 45 controls some or all functions of the terminal 1 or at least some of the units shown in FIG. 4. An acoustical unit 46 enables acoustical announcement of broadcast content if available in, or convertible to, acoustical form. A display unit 47 enables visual display of broadcast or other content.

Figure 5:
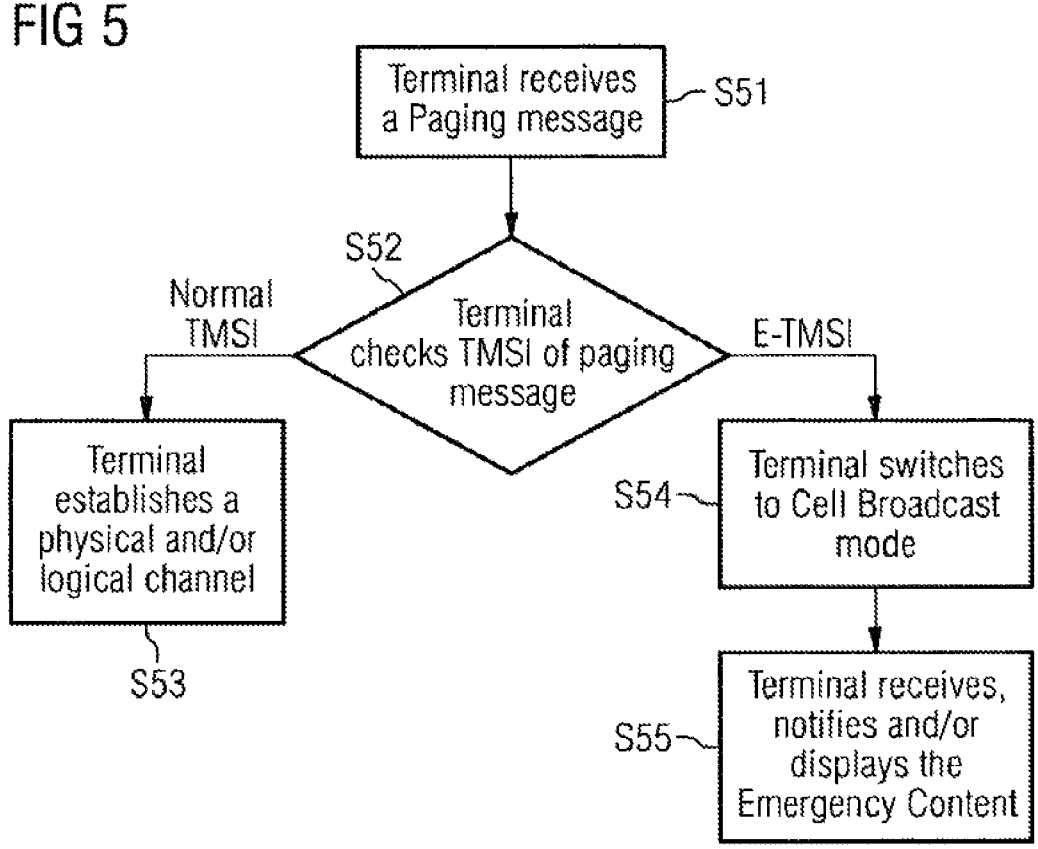
FIG. 5 is a flow chart of an embodiment of a method as implemented in a terminal.

FIG. 5 illustrates functions of a terminal such as terminal 1 in accordance with one, more or all of the embodiments. When the terminal 1 receives, in step S51, a paging message, the terminal 1 or paging mode unit 42 of FIG. 4 checks, in step S52, whether the TMSI included in the paging message corresponds to the TMSI allocated to the terminal 1 from the network, or to the specific identifier, or one of the specific identifiers, indicating an emergency or other situation of public interest, and stored in memory unit 44 of FIG. 4. When the terminal detects, in step S52 that the TMSI in the paging message corresponds to the temporary TMSI allocated from the network to the terminal, the process proceeds to step S53 wherein the terminal establishes a physical and/or logical channel in the customary manner. If the terminal detects, in step S52 that the TMSI in the paging message corresponds to the specific identifier E-TMSI, or one of the specific identifiers stored in memory unit 44, the process proceeds to step S54 wherein the terminal 1 switches to support or listen to the Cell Broadcast mode, and receives, notifies and/or displays the broadcast content, e.g. emergency content, in step S 55. When the TMSI of the received paging message does not correspond to either of the allocated TMSI or E-TMSI, the paging message is neglected without any response.

In accordance with at least one or more of the embodiments, a paging mechanism such as the existing circuit-switched, CS, paging mechanism may be used for sending a paging message to the terminals which are attached to a cell or listening to a sender such as a base station or Node B. The paging message may include a specific identifier such as a specific temporary mobile subscriber identity, TMSI. The terminal checks a received paging message in the usual manner with regard to the TMSI or identifier so as to detect whether the paging message is directed to the terminal. When the terminal detects that the identifier included in the paging message is the specific identifier the terminal is thus informed that the paging message is to be interpreted as an emergency notification. The terminal is configured to switch to, or activate the broadcast service when receiving such a paging message including the specific identifier. The paging mechanism is thus modified to switch the terminal to the broadcast reception mode. The mechanism and messages are backwards compatible with terminals not being able to interpret paging messages as emergency notifications. A terminal which is unable to interpret a paging message including the specific identifier as an emergency notification may simply disregard the paging message.

In at least one of the embodiments, such a paging message is formed so as to include the specific identifier formed as a specific TMSI. All terminals are identifying the received specific TMSI as valid.

Usually terminals receive a TMSI derived from the international mobile subscriber identity, IMSI. The use of the IMSI allows a staggering of the terminals to be paged into 10 groups, allowing for large DRX cycles.

In GSM ten paging groups exist so that only 10% (derived from the IMSI) of all terminals in a cell sending the paging message listen to a paging message. The network will change the paging groups in the next paging cycles so as to page all terminals.

3GPP TS 23.003 V7.1.0 (2006 September), chapter 2 defines actually valid subscriber identities such as IMSI, TMSI or P-TMSI. In accordance with one, more or all of the embodiments, an additional specific identifier such as E(mergency)-TMSI can be used, and may additionally be defined in this chapter. Instead of E(mergency)-TMSI any other name may be used for this specific identifier, provided that the format and content is such that the terminals can recognize the specific identifier as an indication to switch to the listening to the cell broadcast service.

Similar to a normal TMSI assigned to a terminal having local significance within a VLR and the area controlled by a VLR, or within an SGSN and the area controlled by an SGSN, the specific identifier such as E-TMSI may consist of 4 octets and can be coded using, e.g., a full hexadecimal representation, with the structure and coding optionally chosen in order to meet local needs. The terminals may be informed on the specific identifier or identifiers either at the production stage or later by device management or the like, and store this specific identifier or identifiers either continuously or until replacement by other specific identifiers or cancellation.

The discrimination between a normal TMSI temporarily assigned to the terminal and the specific identifier may be done using some bits of the TMSI. An E-TMSI can be fixed and will thus not only temporarily be assigned, and can be valid in several terminals and cells so that the specific identifier will not change when roaming.

The specific identifier such as E-TMSI may be stored, similar to a normal TMSI, in the subscriber identity module, SIM, or in another storage of the terminals so that some or all terminals store the same specific identifier.

When receiving a paging message, the terminals check if the TMSI included in the paging message corresponds to the allocated TMSI or to the specific identifier.

Contrary to a normal TMSI, the specific identifier is not exclusively allocated to one terminal only but is identically set in several terminals or all terminals in accordance with one, more or all of the embodiments.

A terminal may be a mobile station or user equipment or any other type of mobile or stationary device.

Terminals such as mobiles in accordance with at least one of the embodiments now accept in paging messages the TMSI as before, and a specific identifier such as an E(emergency)-

TMSI, which may also indicate a paging group allocation, and is generically accepted by all terminals. The E-TMSI uses a number pattern unique to indicate emergency situations. In order to avoid a disadvantage that 10% of all terminals in a paging area accepting this paging message (and in the next paging message the next 10% would come, and so on) would seek to establish a point to point connection to get the emergency message content delivered, thus leading to a rush to the resources likely to drive the system into an overload situation, the terminals are adapted to switch to the broadcast reception mode when detecting the specific identifier in the paging message, instead of establishing a point to point connection.

According to embodiments, the advantages of both GSM techniques; cell broadcast service and paging mechanism, can be combined into an efficient emergency provisioning system.

The method introduces a specific identifier such as E-TMSI, as previously described, as a generic identifier for indicating an emergency situation. When a mobile receives a valid E-TMSI, it does not establish a PtP connection. Instead it switches to Cell-Broadcast mode and starts to monitor the Cell-Broadcast Notification channels for emergency information contents. The E-TMSI may be formed in different ways, but all are a priori known as E-TMSI to the terminal.

In accordance with one or more of the embodiments, not only one specific identifier such as only one E-TMSI may be provided but a group of two or more specific identifiers may be provisioned. The presence of a group of E-TMSI allows the following options.

A first specific identifier, first E-TMSI, will activate the Cell-Broadcast Mode in the terminal for an infinite time, i.e. the user has manually to disable the service. The terminal will hence start to continuously receive all cell broadcast messages until manual switch-off.

A second E-TMSI of another form or bit content will activate the Cell-Broadcast Mode in the terminal for a defined time (e.g. 1 hour) only, and then the terminal de-activates the cell-broadcast mode autonomously. This shall enable battery saving, and can be used if the emergency is predictably of a limited severity.

A third E-TMSI of another form or bit content can be used to segregate groups of users, e.g. medical personal, law enforcement staff etc. The use of this E-TMSI can be used to distribute specific information to specific groups.

When a group of specific identifiers exists, the network will select a specific identifier depending on the type of emergency or the content of the information to be broadcast, and will include the selected identifier into the paging message or messages transmitted in the cell or cells.

In this embodiment, a group of TMSI codes is introduced, which are used as specific identifiers or E-TMSI. The terminal has a priori knowledge of the valid E-TMSI set and refrains from establishing an individual physical and logical Channel when receiving a paging message which includes one of these specific identifiers. Instead thereof, the reception of an E-TMSI in a paging message initiates the cell broadcast service support autonomously in all terminals which have received the specially formatted paging message.

The terminals then monitor the Cell Broadcast Notification Channel, and receive the emergency message efficiently as a broadcast message.

Advantageously, all needed technology is already present. The introduction of one or a subset of new TMSI values, which will cause a pre-defined mobile behaviour, allows the temporary use of the cell broadcast service, which service is usually disabled due to power consumption reasons.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

What is claimed is:

1. A method of communicating in a bi-directional cellular wireless communication system between a base station and a plurality of mobile terminals supporting an emergency warning, the method comprising:
    storing, at a mobile terminal of the plurality of mobile terminals, at least two specific identifiers common to the plurality of mobile terminals, the at least two specific identifiers being for different types of emergencies;
    checking, by the mobile terminal, whether a paging message received from the base station includes at least one specific identifier of the at least two specific identifiers;
    switching, by the mobile terminal, to a broadcast mode for receiving broadcast content on a broadcast channel when the received paging message includes the at least one specific identifier of the at least two specific identifiers; and
    establishing, by the mobile terminal, at least one of a physical channel and a logical channel when the received paging message includes a mobile terminal identifier allocated to the mobile terminal.

2. The method of claim 1, wherein the mobile terminal identifier is at least one of a temporary mobile subscriber identity, an international mobile subscriber identify, and a packet temporary mobile subscriber identity.

3. The method of claim 1, wherein the broadcast mode is a GSM cell-broadcast mode.

4. The method of claim 1, wherein the mobile terminal notifies and/or displays to a user of the mobile terminal the broadcast content.

5. The method of claim 1, wherein a duration of the broadcast mode is dependent on the at least one specific identifier of the at least two specific identifiers.

6. The method of claim 5 wherein the duration of the broadcast mode is for an indefinite length of time or for a limited duration of time based on the at least one specific identifier of the at least two specific identifiers.

7. A mobile terminal configured for operating in a bi-directional cellular wireless communication system having a base station and a plurality of other mobile terminals supporting an emergency warning, the mobile terminal comprising:
    a memory unit configured to store at least two specific identifiers common to the plurality of other mobile terminals, the at least two specific identifiers being for different types of emergencies; and
    a control unit configured to:
        check whether a paging message received from the base station includes at least one specific identifier of the at least two specific identifiers;
        switch to a broadcast mode for receiving broadcast content on a broadcast channel when the paging message received from the base station includes the at least one specific identifier of the at least two specific identifiers; and establish at least one of a physical channel and a logical channel when the received paging message includes a mobile terminal identifier allocated to the mobile terminal.

8. The mobile terminal of claim 7, wherein the mobile terminal identifier is at least one of a temporary mobile subscriber identity, an international mobile subscriber identify, and a packet temporary mobile subscriber identity.

9. The mobile terminal of claim 7, wherein the broadcast mode is a GSM cell-broadcast mode.

10. The mobile terminal of claim 7, further comprising:
an acoustical unit configured to announce the broadcast content; and
a display unit configured to display the broadcast content.

11. The mobile terminal of claim 7, wherein a duration of the broadcast mode is dependent on the at least one specific identifier of the at least two specific identifiers.

12. The mobile terminal of claim 11, wherein the duration of the broadcast mode is for an indefinite length of time or for a limited duration of time based on the at least one specific identifier of the at least two specific identifiers.

13. A bi-directional cellular wireless communication system adapted to implement a cell broadcast service and a paging mode, the system comprising:
a transmitter configured to broadcast content and transmit at least one paging message to a plurality of mobile terminals in a cell; and
the plurality of mobile terminals, each of the plurality of mobile terminals comprising:
a memory unit configured to store at least two specific identifiers supporting an emergency warning, the at least two specific identifiers being for different types of emergencies; and
a control unit configured to:
check whether the at least one paging message received from the transmitter includes at least one specific identifier of the at least two specific identifiers;
switch to a broadcast support mode for receiving the content transmitted by the transmitter on a broadcast channel when the at least one paging message transmitted by the transmitter includes the at least one specific identifier of the at least two specific identifiers; and
establish at least one of a physical channel and a logical channel when the received paging message includes a mobile terminal identifier allocated to the mobile terminal.

14. The system of claim 13, wherein the mobile terminal identifier is at least one of a temporary mobile subscriber identity, an international mobile subscriber identify, and a packet temporary mobile subscriber identity.

15. The system of claim 13, wherein a duration of the broadcast mode is dependent on the at least one specific identifier of the at least two specific identifiers.

16. The system of claim 15, wherein the duration of the broadcast mode is for an indefinite length of time or for a limited duration of time based on the at least one specific identifier of the at least two specific identifiers.

17. A method of communicating with a plurality of mobile terminals in a bi-directional cellular wireless communication system between a base station and the plurality of mobile terminals, the method comprising:
broadcasting, at the base station, content to the plurality of mobile terminals in a cell;
transmitting, at the base station, at least one paging message to the plurality of mobile terminals in the cell;
storing, at one of the plurality of mobile terminals, at least two specific identifiers common to the plurality of mobile terminals supporting an emergency warning, the at least two specific identifiers being for different types of emergencies;
checking, by the one of the plurality of mobile terminals, whether the at least one paging message received from the base station includes at least one specific identifier of the at least two specific identifiers;
switching, by the one of the plurality of mobile terminals, to a broadcast mode for receiving broadcast content on a broadcast channel when the received paging message includes the at least one specific identifier of the at least Iwo specific identifiers; and
establishing, by the one of the plurality of mobile terminals, at least one of a physical channel and a logical channel when the received paging message includes a mobile terminal identifier allocated to the one of the plurality of mobile terminals.

18. The method of claim 17, wherein the mobile terminal identifier is at least one of a temporary mobile subscriber identity, an international mobile subscriber identify, and a packet temporary mobile subscriber identity.

19. The method of claim 17, wherein a duration of the broadcast mode is dependent on the al least one specific identifier of the al least two specific identifiers.

20. The method of claim 19, wherein the duration of the broadcast mode is for an indefinite length of time or for a limited duration of time based on the at least one specific identifier of the at least two specific identifiers.

* * * * *

UNITED STATES PATENT AND TRADEMARK OFFICE
CERTIFICATE OF CORRECTION

| | |
|---|---|
| PATENT NO. | : 9,037,129 B2 |
| APPLICATION NO. | : 14/519893 |
| DATED | : May 19, 2015 |
| INVENTOR(S) | : Michael Faerber et al. |

Page 1 of 1

It is certified that error appears in the above-identified patent and that said Letters Patent is hereby corrected as shown below:

In the Specification

Column 1:
Lines 8-15, change
"This application is a continuation of U.S. patent application Ser. No. 12/450,608 filed Feb. 2, 2010, which is pending; which is the U.S. National Stage of International Application No. PCT/EP2008/053915, filed Oct. 2, 2009 with an assigned §371(c) acceptance date of Feb. 2, 2010; which claims the benefits of European Application No. 07006867 filed on Apr. 2, 2007; which are incorporated by reference herein in their entirety."
to
--This application is a continuation of U.S. Patent Application No. 12/450,608 (now U.S. Patent No. 8,868,060), filed October 2, 2009 with an assigned §371(c) acceptance date of February 2, 2010; which is a U.S. National Stage Entry of PCT/EP2008/053915, filed April 2, 2008; which claims priority to European Application No. 07006867.1, filed April 2, 2007; which are incorporated by reference herein in their entirety.--;

In the Claims

Column 6:
Line 50, Claim 6, change "claim 5 wherein" to --claim 5, wherein--;

Column 8:
Lines 32-33, Claim 17, change "at least Iwo specific" to --at least two specific--;
Line 44, Claim 19, change "the al least one" to --the at least one--; and
Line 45, Claim 19, change "the al least two" to --of the at least two--.

Signed and Sealed this
Tenth Day of November, 2015

Michelle K. Lee
*Director of the United States Patent and Trademark Office*